United States Patent [19]
Boulard et al.

[11] Patent Number: 4,474,101
[45] Date of Patent: Oct. 2, 1984

[54] PROCESS AND SYSTEM FOR STORING AND RELEASING A CYLINDRICAL OBJECT FROM A VEHICLE

[76] Inventors: Francois Boulard, Villa Pascal - Le Collet du Pastre - La Garonne, 83220 Le Pradet; Joseph Milioti, Avenue du Ponant-Val de l'Aspé, 83700 Saint-Raphael, both of France

[21] Appl. No.: 358,207

[22] Filed: Mar. 15, 1982

[30] Foreign Application Priority Data

Mar. 24, 1981 [FR] France .................. 81 05804

[51] Int. Cl.³ .................................... F41F 5/02
[52] U.S. Cl. ........................... 89/1.5 R; 89/1.5 F; 89/1.817; 102/505
[58] Field of Search ............ 89/1.5 R, 1.5 F, 1.816, 89/1.817; 102/357, 360, 352, 341, 342, 351, 334, 505, 340; 114/238, 239, 367; 441/32, 33

[56] References Cited

U.S. PATENT DOCUMENTS 3,387,537 6/1968 Chakoian et al. ............... 89/1.5 R
4,164,887 8/1979 Ouellette ........................ 89/1.5 R

FOREIGN PATENT DOCUMENTS 2462267 3/1977 Fed. Rep. of Germany ...... 114/238

Primary Examiner—Harold J. Tudor
Assistant Examiner—Tyrone Davis
Attorney, Agent, or Firm—Parkhurst & Oliff

[57] ABSTRACT

The invention is a process and device for storing to and then releasing a cylindrical object from a vehicle.

The system according to the invention consists of a cylindrical container 1 inside which a cylindrical object 2 is placed. Container 1 has a fixed rear cap 6, an inflatable bladder 11, a disc 12 interposed between the inflatable bladder 11 and the object to be released 2, a compartment for the object to be released 2 and an ejectable cap 7 containing a locking device 8 which can be unlocked by the impact of a firing pin 9.

One application of the instant invention is the release at sea, of buoys, markers, containers offering assistance to the shipwrecked or any other similar cylindrical object.

15 Claims, 8 Drawing Figures

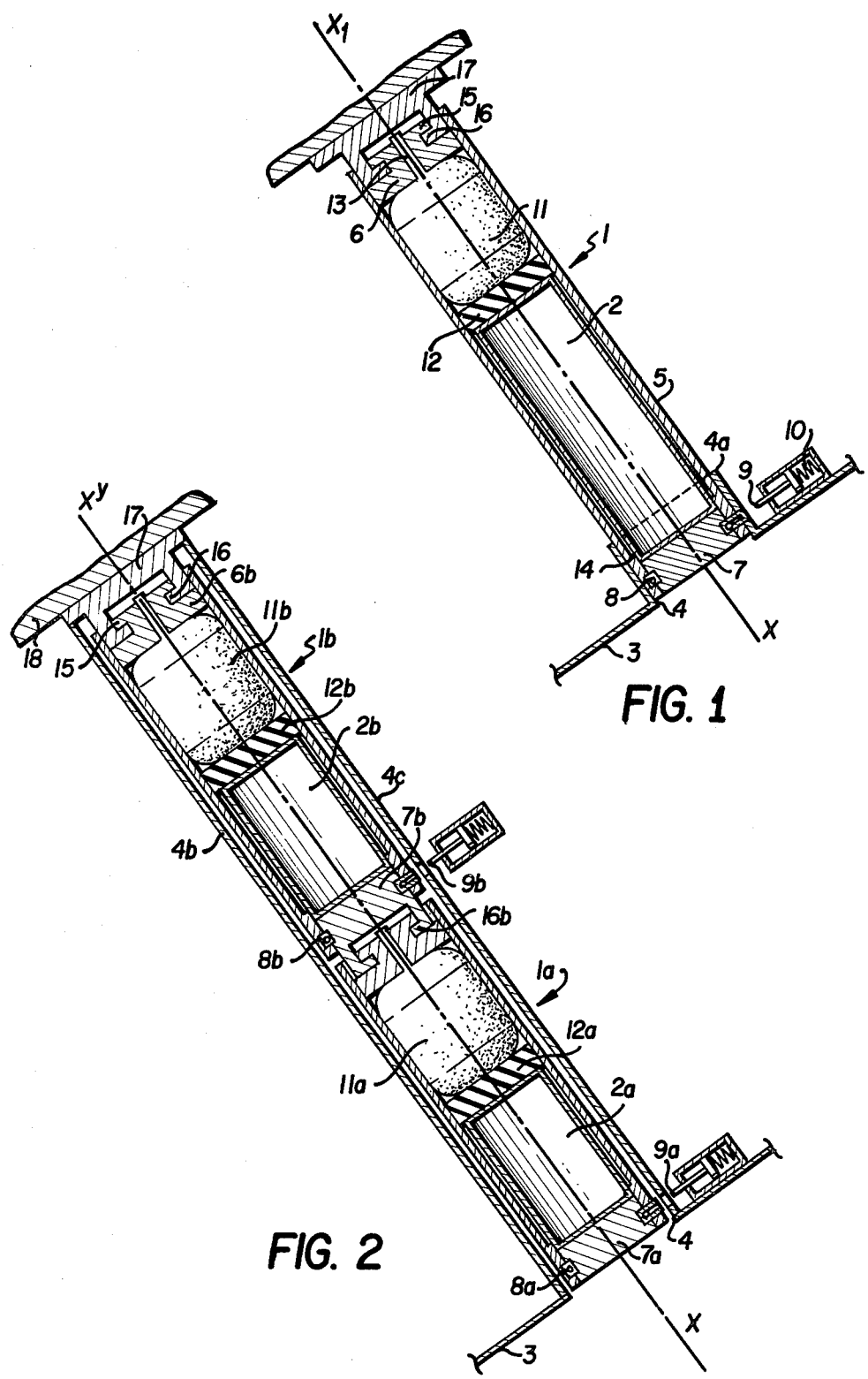

PROCESS AND SYSTEM FOR STORING AND RELEASING A CYLINDRICAL OBJECT FROM A VEHICLE

The purpose of this invention is a process and systems designed to store then to release a cylindrical object, for example releasing a cylindrical buoy at sea, from an aircraft or vessel.

The remainder of the explanation will more especially refer to release at sea of listening or measuring buoys, or smoke or illuminating markers and, more generally, cylindrical objects with a weight in the region of five to thirty kilograms, a length from 30 to 100 cm and a diameter of around 10 cm. These objects can also be cylindrical containers containing provisions, medicines or first aid equipment to be launched from an aircraft or helicopter to aid shipwrecked people, alpinists in difficulty or populations isolated by snow or an earthquake.

Today aircraft have been equipped with launching tubes in which a cylindrical object is placed before take-off, to be released in flight.

The object should be released either altogether, at clearly determined points, or spread, and the launching tubes contain means by which the crew can prepare launching and command it at the moment required.

The purpose of this invention is to procure a means of packing the objects to be released in view of a long storage time so that storage containers can be used to release the object they contain with a launching speed determined as to intensity and direction.

This objective is attained by a process comprising the following sequence of operations:

The said object to be launched is placed in a cylindrical container whose diameter is slightly greater than that of the object to be released and which contains a first fixed cap blanking off the rear end, an inflatable bladder, a distribution disc interposed between the said bladder and the object and an ejectable cap containing a locking device;

the bladder is slightly inflated and the object can be kept in the container for a long storage period:

on the day of releasing, the bladder is inflated to a pressure between 2 and 10 bar, which varies with the releasing vehicle, and the container placed on one of the release points of the said vehicle which is equipped with a firing pin;

and, at the moment of releasing, the firing pin is actuated, it strikes the locking device on the ejectable cap and the said ejectable cap and object are ejected by the thrust due to the expansion of the compressed air contained in the bladder.

One embodiment of the invention for storing and releasing a cylindrical object, notably a buoy, from a vehicle, consists of a container comprising:

a cylindrical tube whose internal diameter is slightly greater than the external diameter of the said object to be released and whose length is greater than that of the object, and which is open at both ends;

a fixed cap blanking off the rear end of the tube;

an inflatable bladder;

a distribution disc;

a compartment designed to house the object;

and an ejectable cap equipped with a locking device which blanks off the front end of the tube.

Preferably the locking system on the ejectable cap is of a type comprising two link rods hinged together at their ends, forming a knuckle joint with a locking position, and the released vehicle contains a firing pin which, by percussion, unlocks the said knuckle joint, which unlocks the front cap and causes it to be ejected with the object under the thrust of the compressed air contained in the bladder.

The invention results in new containers which can be used both to pack releasable buoys, or any other similar releasable cylindrical object, for a short or long storage time, and to release them, from an aircraft, helicopter or vessel with a speed that can be determined by selecting the inflation pressure of the bladder.

The use of an inflatable bladder offers many advantages. During storage an inflatable bladder with a low inflation pressure can be used to maintain the cohesion of the assembly placed inside the container and the bladder is inflated to the required pressure for release when preparing the latter, before loading the containers in the releasing vehicle.

The use of an inflatable bladder avoids risks of friction or lack of tightness which might occur with containers equipped with a piston and chamber filled with compressed air so that a container equipped with an inflatable bladder obtains, when released, good reproducibility of ballistic characteristics.

According to the invention the containers are equipped with a rear cap having a securing device which cooperates with an additional device carried by the releasing vehicle, and means so that the containers, according to the invention, can be used as launching tubes. According to the invention the containers can also be placed in the gravity launching tubes equipping certain releasing vehicles.

By equipping the containers, according to the invention, with front and rear caps with additional securing devices, several containers can be installed in line, thus increasing the capacity of the releasing vehicles and profiting from the reductions in length of the objects to be released, made possible by the increasing miniaturization of their components, notably electronic components.

The following description refers to the drawings appended which, without being exhaustive, provide examples of producing containers according to the invention.

FIG. 1 is an axial cross-section of a container according to the invention.

FIG. 2 is an axial cross-section of a cascade setup of two containers according to the invention.

Figure 3:
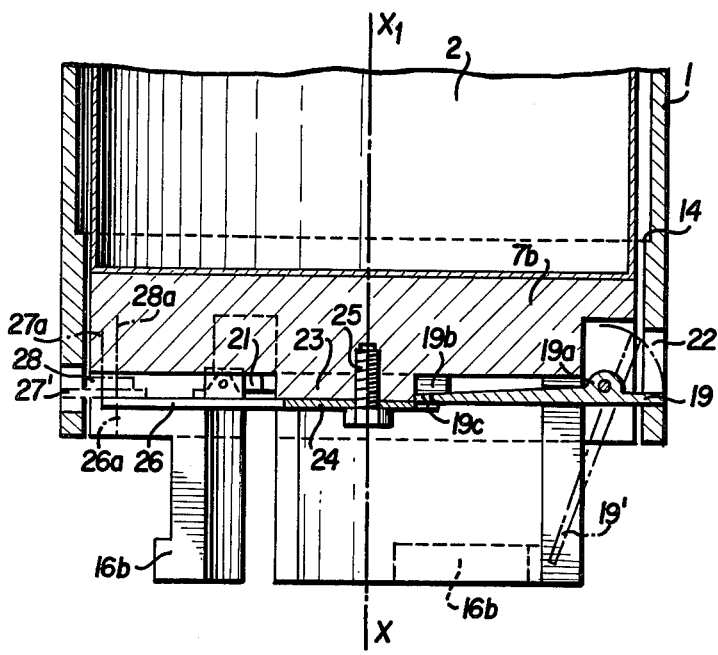
FIGS. 3 and 4 are respectively an axial cross-section and a front view of the first method of producing an ejectable cap locking device.

FIG. 1 shows an axial cross-section of a cylindrical container 1, axis x—x', into which a cylindrical object 2 is placed, prior to being released from an aircraft, of which a part of the fuselage 3 is shown, containing a releasing port 4 opposite which container 1 is installed.

The inclination of the axis x—x' in relation to the aircraft is determined so that the object to be released leaves the aircraft on a path of determined direction so as to avoid any risk of it striking the aircraft.

Naturally a release aircraft contains a number of release ports 4 through which a container 1 can be placed according to the invention. Each of the release ports 4 is equipped with a device for guiding the container 1, consisting for example of a sleeve 4a.

The word cylindrical is used in a general meaning to designate any volume delimited by parallel generators and it covers cylinders whose transverse section is not circular.

The objects to be released 2 can include, for example, listening or measuring buoys which have to be released at sea, or containers containing assistance such as provisions, medicines or inflatable rubber boats, luminous or smoke markers or acoustical radio-electric markers.

Container 1 has a cylindrical tube 5 whose diameter or cross-section is slightly greater than those of the object 2, so that the latter can slide freely inside the container. The tube 5 is longer than the object 2, for example, a length of around 1.5 times that of the object 2. The tube 5 is open at both ends. The rear end is blanked off by a cap 6 secured to the tube, for example, by screws, or any other equivalent means. The front end of the tube is blanked off by a cap 7 which is an ejectable cap containing a locking device 8 which is unlocked when launched by a firing pin 9 secured to the aircraft. The firing pin 9 is actuated, for example, by a spring 10 or electro-magnet, or any other eqivalent means. Several methods of producing the locking device are described below.

The tube 5 contains an inflatable bladder or envelope 11, placed in contact with the rear cap, and a distribution disc 12 interposed between the bladder 11 and the rear end of the object to be released.

The disc 12 is made from an elastomer material, for example relatively hard artificial rubber. Its task is to protect the inflatable bladder 11 from direct contact with the rear face of object 2 which may contain sharp edges.

The bladder or envelope 11 has a valve 13 crossing through rear cap 6.

A container 1 according to the invention is used as follows. In an initial phase, rear cap 6 carrying bladder 11 with valve 13 and disc 12 are placed successively in the container, followed by the object to be released 2, and finally ejectable cap 7 which is locked in place by locking device 8. Bladder 11 is then slightly inflated so that it holds the object to be released 2 against the ejectable cap 7. In this way extended storage is possible for the objects to be released 2, which, when placed inside the container 1, are effectively protected from dust and impact.

When the day of release arrives, that is, the moment when objects 2 are to be released, the bladder 11 is inflated to an operational pressure, for example, between 2 and 10 bar, through valves 13 prior to placing container 1 in a position for releasing objects 2 from the release vehicle. The inflation pressure can be adjusted according to the speed of ejection required, (which depends on the speed of the releasing aircraft or vessel). The bladders 11 can for instance consist of a thin elastomer envelope whose volume can be increased from five to seven times without tearing.

At the moment of release, the crew of the aircraft triggers the firing pins 9 which strike the locking devices 8 disengaging locking devices 8 and from the cap 7. The cap 7 and the load 2 are ejected by the thrust of the compressed air contained in inflated bladder 11. Owing to its great deformability, bladder 11 can occupy the whole interior volume of tube 5, without being torn, so as to thrust the load 2 from inside the tube 5, out of container 1.

In a preferred embodiment, the wall of tube 5 contains a small internal shouldering 14 which permits the passage of the load 2, through the tube 5 but which stops the disc 12 and the bladder 11 from being ejected from the tube 5. Thus, the latter can be recovered together with the container. Preferably the shouldering 14 is set slightly back from the front end of load 2 so as to avoid any risk of the disc 12 and bladder 11 from becoming hooked to the shouldering.

The use of an inflatable bladder 11 offers advantages as compared to a similar container with a piston pushing the load 2 and, behind it, a chamber filled with compressed air. In fact an airtight piston would have to be used and this would involve problems of tightness of the piston and its friction due to the differences in temperature that the container may have to endure when release takes place at high altitude.

It would also have been possible to consider replacing the bladder by a precompressed spring, but this would produce a less advantageous solution. In fact, a very strong hence costly spring would have to be used, moreover it would not be possible to change the thrust of this spring according to the speeds of ejection required whereas this modification is very easy to obtain by selecting an inflation pressure of bladder 11 suited to each case of launching.

FIG. 1 shows an example of using a container according to the invention, as a launching tube. In this case the rear cap 6 contains slots 15 forming the male section of a bayonet or similar coupling which cooperate with the complementary slots 16, forming the female section of a support 17 secured to the launcher and which directs the x—x' axis of the container in a clearly determined position with reference to a launcher so as to obtain a determined direction of the speed of launching.

Naturally support 17 is secured to the launcher opposite a launching port.

As an alternative, in the event that the releasing vehicle is already equipped with fixed launching tubes, the containers 1 can be placed, according to the invention, in these tubes.

In another version, the front cap 7 can also contain, on its outer face, a female assembly adaptor identical to adaptor 16 and, in this case, it is possible to install several containers cascadewise, one behind the other, and release them one after the other.

FIG. 2 shows an example of this cascade setup of two coaxial containers providing for successive release of two cylindrical loads 2a and 2b via the same releasing port 4 which is equipped, in this example, with guidance slide-bars 4b, 4c.

The container 1b is fixed, as in the case in FIG. 1, on a support 17, containing assembly slots 16, which is secured to the structure 18 of the launcher.

The front cap 7b of container 1b contains assembly slots 16b identical to slots 16, so that a second container 1a with a rear cap 6a identical to cap 6b can be assembled coaxially on the slots, etc., etc. Naturally in this case, the releasing vehicle must have several firing pins 9a, 9b spread along the container to command the successive releases.

This cascade setup offers the advantage of releasing successively several loads through the same releasing port. It increases the launching capacity of a vehicle and enables the reduction in length of loads 2, made possible by the increasingly advanced miniaturization of their components, notably the electronic ones, to be taken full advantage of.

FIG. 3 is an axial cross-section at a larger scale of the front end of a container according to the invention.

Figure 4:
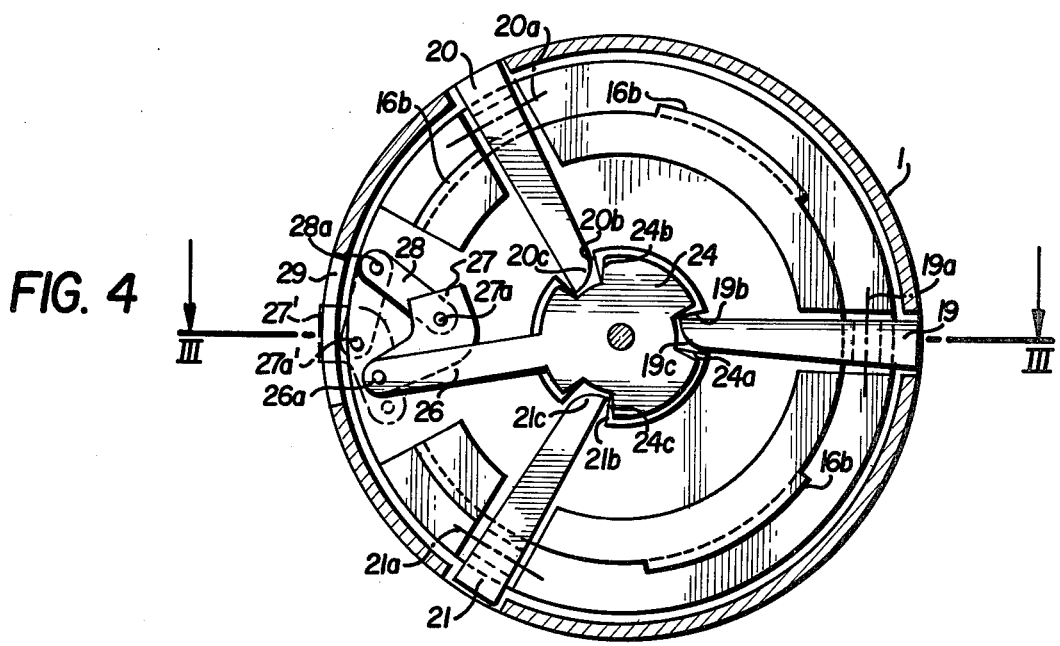

FIG. 4 is a bottom view of FIG. 3.

FIGS. 3 and 4 show the front end of a container 1 equipped with an ejectable cap 7b enabling a second container to be fixed cascadewise on this cap, as shown on FIG. 2.

The cap 7b shown on FIGS. 3 and 4, contains extensions to the outside 16b forming male tenons in a slot form designed to cooperate with the tenons 17 of the rear cap of another container. The tenons in this bayonet assembly are arranged in such a way that the two containers can only be assembled in one single position in order for the unlocking device triggers to be in line.

FIGS. 3 and 4 show a first method of producing a locking device for the ejectable cap.

This device consists of several levers, for example three levers 19, 20 and 21 are installed at 120° from each other. Each lever hinges around a pin. Pins 19a, 20a and 21a, respectively correspond to levers 19, 20 and 21 and are located close to the circumference.

The short arm of each lever, inserts into a slot 22 cut out of the wall of container 1.

The long arm of each lever inserts into notches 19b, 20b, and 21b radially cut in a central boss 23. Boss 23 extends the body of the cap to the exterior of tube 5. Outside this boss 23, a rotary disc 24 is located which can pivot around a central pin 25. This disc 24 also contains three notches 24a, 24b and 24c which are superposed on notches 19b, 20b and 21b when the system is locked.

Disc 24 is integral with an arm 26 who free end is hinged in 26a on a knuckle-joint or compass system consisting of two moving link rods 27 and 28. The link rod 28 is hinged by a pin 28a to the cap and 27a to the intermediate link rod 27 itself hinged by a pin 26a to arm 26.

The knuckle-joint is shown in continuous lines on FIG. 4 in the unlocked position and in dotted lines in the locked position, in which the joint 27a has changed to position 27a' located outside the alignment of the two pins 28a and 26a. It can be seen that in this position link rod 27 occupies a position 27' opposite a window 29 cut out of the wall of the container. When the knuckle-joint is in the dotted line position, arm 26 and disc 24 have pivoted slightly so that disc 24 blanks off notches 19b, 20b and 21b in which the long arms of the three levers are inserted and held captive.

Operating the invention is as follows.

Before releasing buoy 2, the air pressure in bladder 11 forces the bladder against cap 7b and levers 19, 20 and 21, inserted in slots 22 and which cannot pivot, and lock the cap.

Disc 24 and arm 26 cannot pivot in the direction which would release the levers, because the knuckle-joint is locked. Link rod 27 and is occupies position 27' flush with the wall of the container.

To release an object 2, such as buoy, a firing pin 9 is triggered, striking the link rod 27 and unlocking the knuckle-joint. Each lever 19, 20 and 21 has, at the end of the long arm, an inclined section 19c, 20c, 21c forming a ramp which tends to pivot the disc 24 under the effect of the thrust of the bladder, in the direction of closing the compass formed by parts 27 and 28, which places notches 24a, 24b and 24c above notches 19b, 20b and 21b and releases levers 19, 20 and 21. The latter pivots to occupy a position such as 19' shown on FIG. 3 and cap 7b is ejected at the same time as the buoy object to be released 2.

Figure 5:
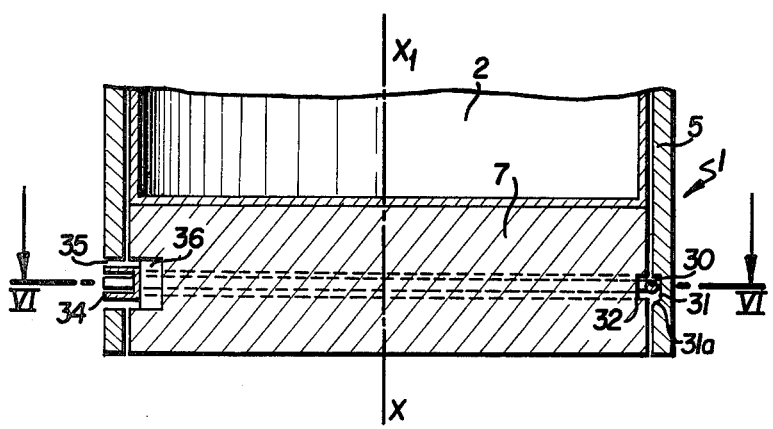
FIGS. 5, 6 and 7 are respectively an axial cross-section, transverse cross-section and partial perspective view of a second method of producing an ejectable cap locking device.
Figure 6:
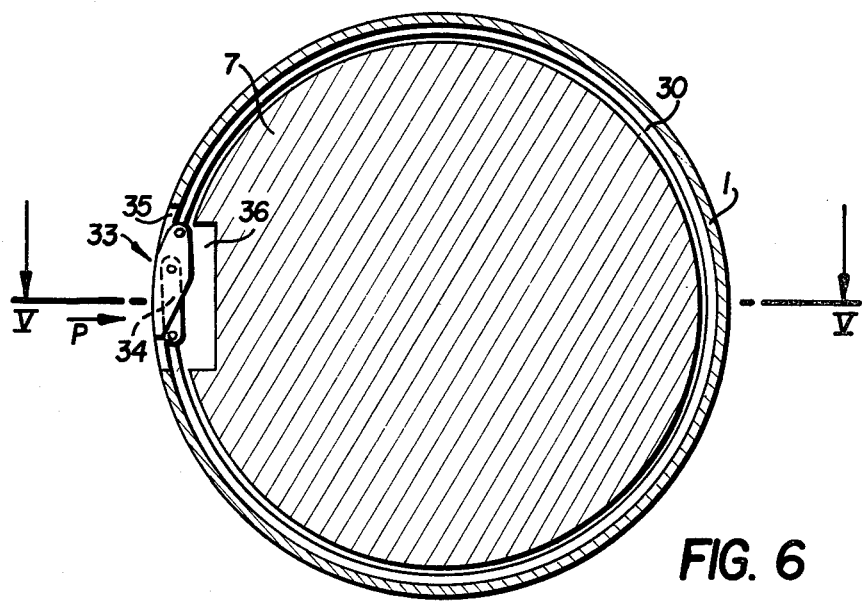

FIGS. 5 and 6 show, in axial and transverse cross-section, another method of producing an ejectable front cap 7. In this embodiment, a cap 7 is equipped with a bayonet assembly device 16b and can be locked to container 1 by a retaining or spring ring 30 placed in a groove 31 hollowed from the internal circumference of the front end of tube 5 and in a groove 32 hollowed from the external circumference of cap 7. The depth of groove 32 is greater than the diameter of retaining ring 30, so that the latter can be housed in groove 32. Retaining ring 30 is prestressed so that it tends, under the effect of elastic forces, to reclose and reenter groove 32. Retaining ring 30 is open and the two ends are linked together by a knuckle-joint or compass type locking device 33. Groove 31 has an inclined outer edge 31a which facilitates the closing of spring ring 30.

FIGS. 5 and 6 show the device 33 in locked position, in which retaining ring 30 is held open and partly inserted into groove 31, thereby preventing cap 7 from being ejected. As can be seen in FIGS. 5 and 6, the locking system comprises an intermediate part 34 which, when in the unlocked position is flush with the outside wall of the container, and when in locked position, extends through a window 35 in the said wall of the container.

To unlock the locking device, firing pin 9 is actuated, striking part 34 in the direction of the arrow P. The firing pin 9 unlocks the knuckle-joint which is housed in a housing 36, provided in cap 7.

Figure 7:
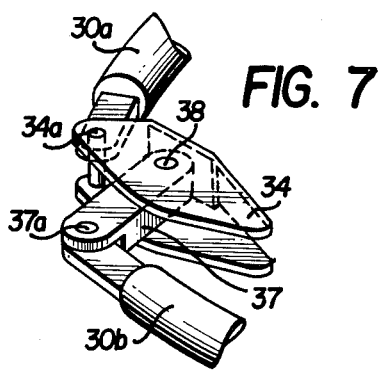

FIG. 7 shows a perspective view of the locking device of in FIGS, 5 and 6. In this figure the two ends 30a and 30b of retaining ring 30 can be seen, in particular end 30a hinges around a pin 34a on a link rod 34 in clevis or yoke form. End 30b is hinged around a pin 37a on a second intermediate link rod 37. Link rod 37 is hinged around a pin 38 on part 34. The two link rods 34, and 37 form a compass, with hinge point 38 at the summit. If hinge point 38 is placed outside the alignment defined by pins 36a and 37a, the elastic forces applied by retaining ring 30 keep this compass locked as long as firing pin has not forced inside part 34.

In the method shown in FIGS. 5 and 7 at, the moment of releasing, retaining ring 30 is housed inside groove 32 of the cap and is ejected at the same time as the cap.

In yet another alternative embodiment, a spring ring can be used which tends to open, thus making it necessary to thicken the wall of tube 5 in order to house a sufficiently deep groove to contain the spring ring. In this embodiment, the ring remains in the groove of the container when ejecting the objects to be released 2, and can be reemployed.

Figure 8:
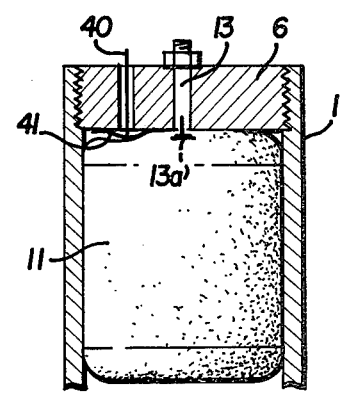
FIG. 8 is an axial cross-section of the rear end a container according to the invention.

FIG. 8 shows an axial cross-section at larger scale at the rear end of the container 1. A fixed gap 6 can be seen on this cross-section. This embodiment contains a threaded cap and bladder 11 with an inflation valve 13 crossing through the cap, and an additional valve 13a. FIG. 8 also shows a pressure pick-up device consisting of a rod 40 crossing the cap and resting against a spring leaf 41 secured to an inner face of the cap. When bladder 11 is normally inflated, it crushes spring 41 and rod 40 projects outside the cap where it actuates the contact indicating normal inflation.

In case of lack of pressure on the bladder, which might involve accidents when releasing, rod 40 opens the contact which actuates an alarm prohibiting releasing of the objects.

I claim:

1. A process for storing and releasing an object from a release port of a release vehicle that includes a device for storing and releasing said object, said device comprising a cylindrical container with a diameter slightly greater than that of the object to be released, a fixed cap blanking off one end of the cylindrical container, an inflatable bladder adjacent to said fixed cap, a distribution disc interposed between the inflatable bladder and an object to be released, and an ejectable cap with a locking system, said cap blanking off an opposite end of said container, wherein said process for storing and releasing comprises the sequential steps of:
- slightly inflating the bladder for storing said object without movement in said container;
- inflating the bladder to an inflation pressure sufficient for expelling said object which maintains engagement of said ejectable cap with said container;
- releasing said object by striking a portion of the locking system of the ejectable cap with a firing pin disposed on said release vehicle and disengaging the ejectable cap from the container, thereby ejecting the ejectable cap and said object from the container by allowing the compressed air contained in the bladder to expand.

2. The process according to claim 1, wherein said object is a buoy.

3. The process according to claim 1, wherein said inflation pressure of said bladder for ejecting said object is variable in relation to the speed of the release vehicle.

4. The process according to claim 1, wherein said inflation pressure of said bladder is in the range of 2-10 bar.

5. A device for storing and releasing an object, comprising:
- a cylindrical tube open at both ends, said tube having an internal diameter slightly greater than an external diameter of said object and a length greater than the length of said object;
- a first cap secured to and blanking off one end of said tube;
- a second cap releasably secured to and blanking off the other end of said tube, said second cap including a locking device for releasably securing said second cap to said tube;
- an inflatable bladder disposed adjacent said first cap inside said tube; and
- a distribution disc disposed between said inflatable bladder and said object.

6. The device according to claim 5, wherein said locking device of said second cap further comprises:
- two link rods forming a knuckle-joint attached to an arm radially extending from a central portion of said second cap, said knuckle-joint having a locked position and an unlocked position, said knuckle joint being positioned in the locked position to contact a firing pin secured to said release vehicle; and said knuckle-joint being movable from said locked position to said unlocked position when triggered by said firing pin, thereby enabling said second cap and said object to be ejected from said container.

7. The device according to claim 6, wherein said locking device for said second cap further comprises:
- a plurality of radial levers each engaging said second cap;
- said radial levers each comprising a short arm engaging one of a plurality of slots cut in a wall portion of said container and a long arm engaging one of a plurality of first notches cut in a central boss disclosed on said second cap; and
- a rotary disc disposed over said central boss and having a plurality of second notches aligned with said plurality of first notches cut in said central boss when said central boss is in an unlocked position and non-aligned when said central boss is in a locked position.

8. The device according to claim 7, wherein said locking device further comprises:
- a spring ring housed between first and second grooves, said first groove being cut in an internal wall of said tube and said second groove being cut in an external wall of said second cap; and
- said spring ring having a slot therein to define a split spring ring with two ends, each end of said split spring ring being hinged to one of two said link rods, said split spring ring urging said link rods of said knuckle joint to said closed position.

9. The device as claimed in 6, wherein said second cap further comprises a hollow housing for said link rods when said knuckle-joint is in an unlocked position.

10. The device according to claim 5, wherein said inflatable bladder contains a valve extending through said first cap for inflating said bladder.

11. The device according to claim 5, wherein said device further comprises a pressure pick-up having means for measuring the inflation pressure of said bladder and means for prohibiting release of said object if the inflation pressure drops below a predetermined level.

12. The device according to claim 7, wherein the ends of the long arms of the said levers each have an inclined section which forms a ramp tending to turn the said rotary disc in the unlocking direction.

13. The device according to claim 5, wherein said first cap is secured to the tube by a bayonet securing device cooperating with a complementary securing device carried by a support secured to the releasing vehicle.

14. The device according to claim 13, wherein a plurality of devices are sequentially interconnected, the ejectable cap of one device is extended forward by said complementary securing device so that several containers can be mounted cascadewise.

15. The device according to claim 5, wherein said device further comprises a pressure pickup with means for measuring the inflation pressure of the bladder and means for actuating an alarm if the pressure drops below a predetermined level.

* * * * *